United States Patent
Syvanne et al.

(10) Patent No.: US 7,162,737 B2
(45) Date of Patent: Jan. 9, 2007

(54) SYNCHRONIZATION OF SECURITY GATEWAY STATE INFORMATION

(75) Inventors: Tuomo Syvanne, Vantaa (FI); Mika Jalava, Siuntio (FI)

(73) Assignee: Stonesoft, Helsinki (FI)

( * ) Notice: Subject to any disclaimer, the term of this patent is extended or adjusted under 35 U.S.C. 154(b) by 908 days.

(21) Appl. No.: 09/976,802

(22) Filed: Oct. 12, 2001

(65) Prior Publication Data
US 2002/0112189 A1  Aug. 15, 2002

(30) Foreign Application Priority Data
Feb. 13, 2001  (FI) ................................. 20010267

(51) Int. Cl.
G06F 9/00 (2006.01)
G06F 11/00 (2006.01)
H04L 9/32 (2006.01)
G06F 15/16 (2006.01)

(52) U.S. Cl. .............................. 726/12; 726/3; 726/23; 709/208

(58) Field of Classification Search ................ 713/153, 713/200, 201; 709/229; 726/12
See application file for complete search history.

(56) References Cited

U.S. PATENT DOCUMENTS

| | | | | |
|---|---|---|---|---|
| 5,455,865 A * | 10/1995 | Perlman | ...... | 713/153 |
| 5,968,176 A | 10/1999 | Nessett et al. | ...... | 713/201 |
| 6,049,889 A * | 4/2000 | Steely et al. | ...... | 714/4 |
| 6,078,957 A | 6/2000 | Adelman | | |
| 6,105,027 A | 8/2000 | Schneider et al. | ...... | 707/9 |
| 6,295,585 B1 * | 9/2001 | Gillett et al. | ...... | 711/148 |
| 6,304,973 B1 * | 10/2001 | Williams | ...... | 713/201 |
| 6,442,448 B1 * | 8/2002 | Finley et al. | ...... | 700/231 |
| 6,463,417 B1 * | 10/2002 | Schoenberg | ...... | 705/2 |
| 6,606,744 B1 * | 8/2003 | Mikurak | ...... | 717/174 |
| 6,745,240 B1 * | 6/2004 | Denman et al. | ...... | 709/220 |
| 6,975,626 B1 * | 12/2005 | Eberle et al. | ...... | 370/358 |
| 2004/0064351 A1 * | 4/2004 | Mikurak | ...... | 705/7 |

FOREIGN PATENT DOCUMENTS

| | | |
|---|---|---|
| EP | 0 910 197 A2 | 4/1999 |
| EP | 1 024 627 A2 | 8/2000 |
| GB | 2404121 A * | 1/2005 |
| WO | WO 98/40992 | 9/1992 |

OTHER PUBLICATIONS

Ioannidis S., et al., "Implementing a Distributed Firewall", Proceedings of the 7th, ACM Conference on Computer and Communications Security, CCS 2000, Athens, Greece, Nov. 1-4, 2000, ACM Conference on Computer and Communications Security, New York, NY: ACM, US, vol. Conf. 7, Nov. 1, 2000 p. 190-199, XP001033106, ISBN: 1-58113-203-4.

Steven M. Bellovin, "Distributed Firewalls", The Magazine of the Usenix Association, Online! Nov. 1999, XP002313944.

* cited by examiner

Primary Examiner—Kambiz Zand
(74) Attorney, Agent, or Firm—Ronald C. Fish; Ronald C. Fish, A Law Corporation (57) ABSTRACT

A method (400, 500, 600, 700) for synchronizing state information in a security gateway cluster comprising at least two nodes comprises the following steps. Synchronizing (403) state information by sending state information from a first node of said at least two nodes, detecting (401) in said security gateway cluster a predetermined irregularly occurring action, and initiating (402) synchronization of state information as a response to said action. The state information is sent to at least a second node of said at least two nodes. Corresponding computer program, computer program product, software entities (910, 920), a node (900) of a security gateway cluster (950) and a security gateway cluster are also presented.

18 Claims, 7 Drawing Sheets

SYNCHRONIZATION OF SECURITY GATEWAY STATE INFORMATION

BACKGROUND OF THE INVENTION

Field of the Invention

The invention relates in general to security gateway clusters comprising a plurality of nodes. In particular the invention relates to synchronization of state information between the nodes.

The local networks of various organizations and enterprises are nowadays connected to the public Internet. To protect a local network, special gateway is usually used to connect the local network to a public network. This special gateway is often called a security gateway or a firewall, and the purpose of a security gateway is to prevent authorized access to the local network. Typically there is need to restrict access to a local network from a public network and/or to restrict access from the local network to the public network or further networks connected to the public network. On data packet level this means that data packets, which are entering and/or exiting a local network, are screened or filtered in a security gateway. In addition to filtering data packets a security gateway may secure data packets transmitted between, for example, some communication entities. In this case the security gateway is both a firewall and a VPN (Virtual Private Network) gateway.

Figure 1:
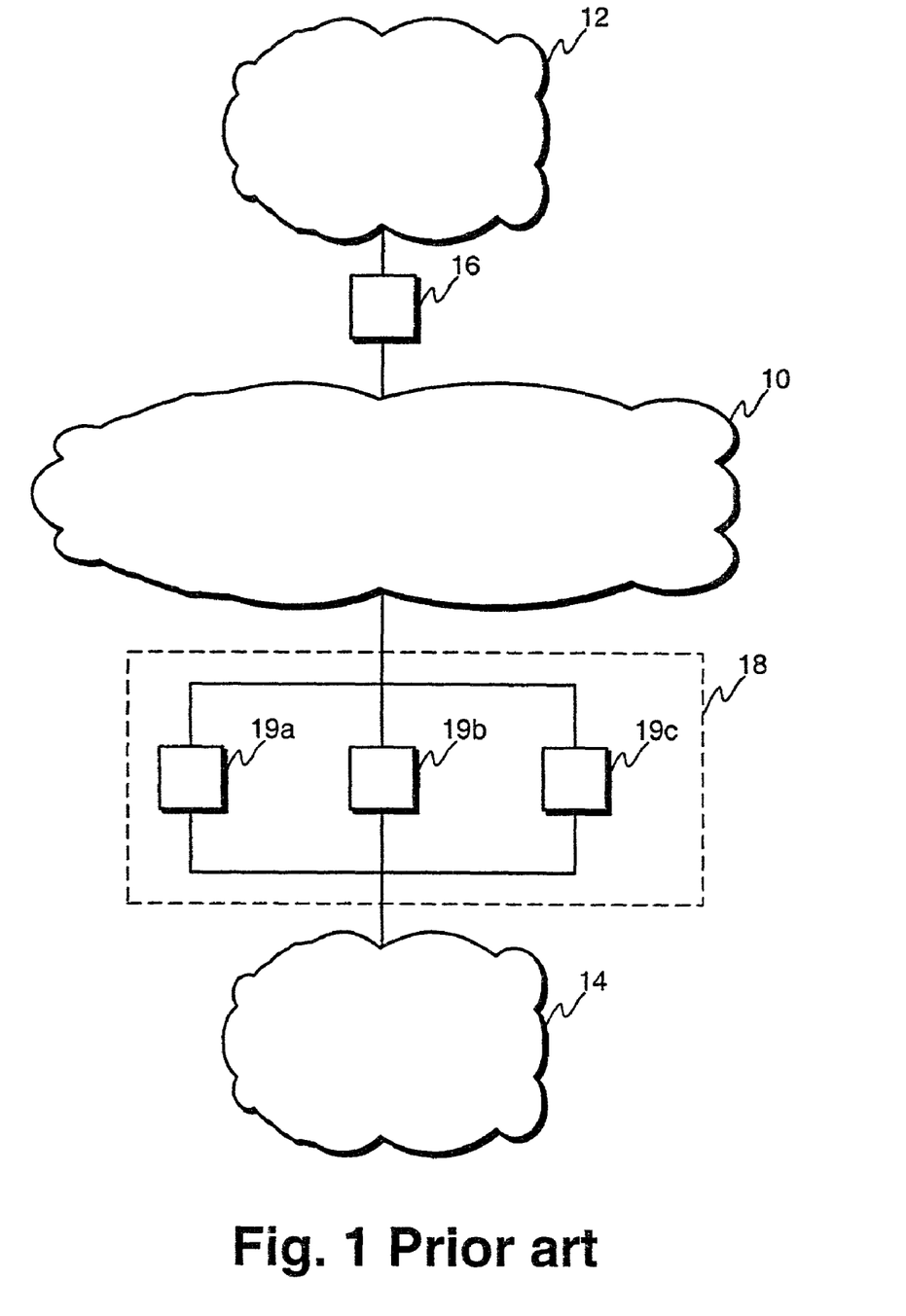
FIG. 1 illustrates two local networks connected to a public network via security gateways.

FIG. 1 illustrates an example with a first local network 12, a second local network 14 and a public network 10. The public network may be, for example, the Internet. The local networks 12, 14 are connected to the public network 10 via security gateway elements 16 and 18, respectively. A security gateway element 16, 18 may be implemented as one network node (server) or as a cluster of nodes. In FIG. 1, security gateway element 18 is a cluster comprising nodes 19a, 19b and 19c. Term security gateway element is used in this description to refer to a network node or to a cluster of network nodes, where data packet screening is performed and which connects at least two networks to each other. A security gateway element may be, for example, a plain firewall node screening packets or a firewall node provided with VPN functionality, or a cluster of such nodes.

Screening of data packets in a network element may be stateless or stateful. Stateless screening refers to packet filtering, where each packet is handled according to a set of rules (or other screening information, see below) without any information about history of packets. Stateless screening is typically used, for example, in routers. Stateful screening refers to a situation, where a data packet initiating a packet data connection is accepted using a set of rules, and consequently information about an accepted packet data connection is stored in the network element for handling the rest of the data packets belonging to the opened packet data connection. Security gateways typically perform stateful screening of data packets. The main reason for using stateful screening is security. Typically, it is required to restrict access from a public network to a local network while allowing entities in the local network to access public network. In stateless screening there must be rules, which allow possible reply packets from the public network to the local network to pass a network element. Many other data packets than proper reply packets may be accepted using such rules. When stateful packet screening is used only those data packets, which are really part of an opened packet data connection, can be accepted.

Figure 2:
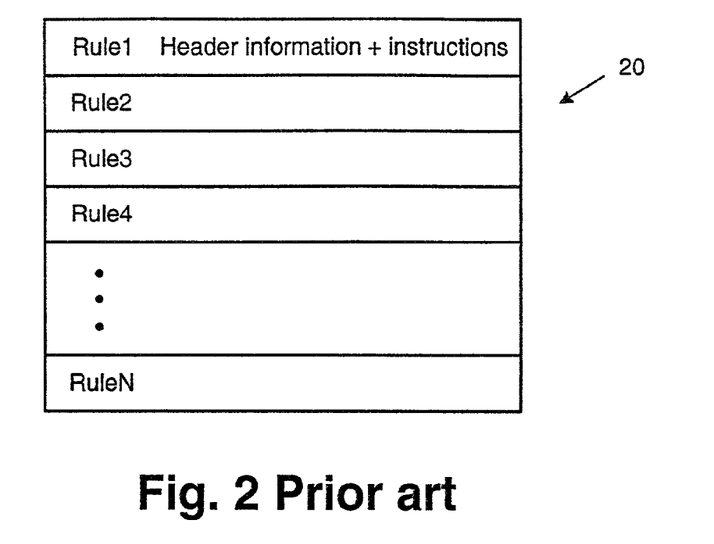
FIG. 2 illustrates a set of rules for screening data packets in a security gateway according to prior art.

The screening of first data packets in stateful screening is usually done using information specifying at least parts of allowed data packet headers and corresponding instructions for processing a data packet. The screening information is usually an ordered set of rules. FIG. 2 illustrates as an example a set 20 of rules, having a first rule Rule1, a second rule Rule2, and so forth. The order of the rules in the rule set typically defines the order in which a header of a data packet is compared to the rules. The instructions specified in the first rule, to which the header of a data packet matches, states the action to be carried out for said data packet. The rules are typically listed in a rule file in the order in which they are processed: a rule file thus typically comprises a sequence of rules Rule1, Rule2, . . . , RuleN. The rule file is typically stored in a security gateway element, for example in security gateway 16.

A typical format for the rules is the following: header information, action. The header information typically involves source address (src), destination address (dst) and protocol (prot) relating to a data packet, and a rule typically has the following form: src, dst, prot, action. This means that for a data packet, which has the indicated header information, the indicated action is carried out. Typically the action defines whether the data packet is discarded or allowed to proceed. As a data packet is processed, its header information is compared to the header information indicated by the rules; the rules are processed in the order defined by the ordered set. Typically the last rule in the ordered set of rules (e.g. RuleN in FIG. 2) does not allow any packet to proceed. This means a data packet, whose header information does not match the header information indicated in any of the preceding rules, is discarded.

In stateful screening information about ongoing data packet connections or about packet data connections relating to ongoing connections is typically stored in a data structure, which is here called a connection data structure. A data packet initiating a packet data connection and arriving at a security gateway element is compared to the screening information. If a rule allowing the data packet to traverse the security gateway element is found, a corresponding entry is made to the connection data structure. Typically, a connection data structure entry comprises some header information of the corresponding data packet and possibly further additional information. Data packets other than packets initiating a packet data connection are then compared to the connection data structure and, if a corresponding entry is found, the packet is allowed to traverse the security gateway element. Thus, only data packets relating to open packet data connections are accepted. As a further advantage, stateful screening may require less processing power than stateless screening, as data packets of an open packet data connection are checked only against the connection data structure, and there is no need to check if the data packets are in accordance with the given, possibly long, set of rules.

The part of the connection data structure that is related to one currently open packet data connection traversing a security gateway element is called an entry. When a packet data connection is closed, the corresponding entry is typically removed (or deleted or cleared) from the connection data structure. The number of entries having information about packet data connections thus typically varies as function of time.

Information about other data packets, which a security gateway element should allow to proceed, may also be dynamically updated to the connection data structure. In many cases a given set of rules is just basic information for making a decision about allowing a certain data packet to proceed. Additional information may also be needed. Consider, for example, FTP (File Transfer Protocol), which has a control connection and the files are transferred using a separate data connection. This separate data connection should be allowed even though a network element outside the local network initiates the FTP data connection, if a related control connection has been established and a request for opening the data connection has been detected within the control connection before the data connection is attempted. A security gateway element should thus be prepared to receive a data packet initiating such a FTP data connection and to allow such a data packet to proceed. Typically, such a data packet initiating a FTP data connection would not be allowed to proceed on the basis of the rules. It is only allowed on the basis of the prior information transferred within the FTP control connection.

Figure 3:
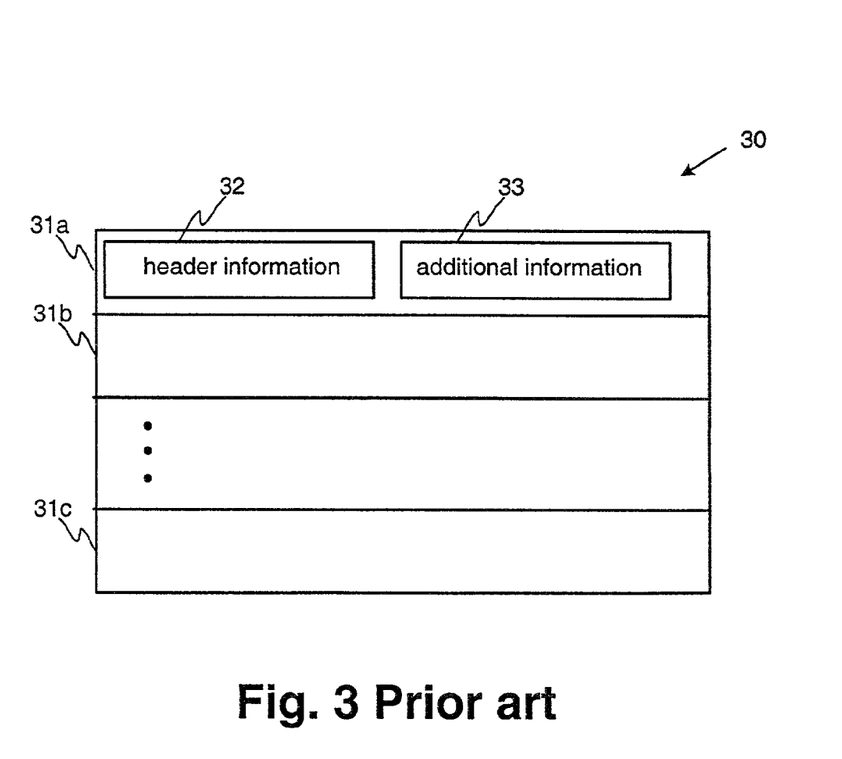
FIG. 3 illustrates a prior art connection data structure.

The connection data structure, where information about data packets that are allowed to arrive and be processed in a security gateway element, may be, for example, a connection data structure 30 described in FIG. 3. In the connection data structure 30 each entry 31 corresponds to a data packet having the header information 32 specified in the table entry. The header information 32 typically comprises the source address, the destination address, the source port and the destination port. A connection data structure entry typically comprises further additional information 33. This additional information may comprise information about the protocol to which the data packet relates. The protocol may be, for example, TCP (transmission control protocol) or UDP (User Datagram Protocol). Furthermore, the additional information may specify NAT (Network Address Translation) details, encrypting keys, routing information and/or a program code, which is used to investigate and optionally modify the contents of a data packet. Term protocol-specific program code is here used to refer to program code, which may be either a separate program, an integrate part of a kernel or a kernel module, and which is used to investigate and optionally modify the contents of data packets. A FTP-specific program code, for example, typically monitors the content of data packets relating to a FTP control connection, and when it finds out that a FTP data connection is to be established, it creates a connection data structure entry for the FTP data connection or otherwise informs the software running in the security gateway element to let data packets relating to said FTP data connection to proceed. There may be separate protocol-specific program codes for various protocols or application programs.

The set of rules, or other screening information, is updated every now and then. It may be updated, for example, periodically to ensure that too old screening information is not used. Alternatively, new screening information may be delivered to a security gateway element from a management system after the screening information has been modified, that is, new screening information is pushed to the security gateway element from the management system.

As discussed above security gateway may be clustered, that is it may consist of several gateway nodes that use some mechanism to share the workload between each other. In this situation a new problem arises. In some cases all packets belonging to a specific connection do not pass through the same node. There may be several reasons for this. One of these is that one or more of the nodes may fail, and the others must continue handling the same connections without a break. The rest of the packets of a connection must thus be handled by a node different from the one that opened the connection. A second reason is that as more complicated communication protocols typically consist of several connections or data streams, different nodes may take the responsibility of these connections or data streams relating to a certain communication session. The complicated protocols are usually handled by special protocol-specific program codes that take care of informing the firewall engine about these related connections, as discussed above.

Because the connections are only checked against the current screening information, typically a set of rules, when they are opened, the rest of the packets belonging to the same connections are passed through depending on the state information, typically a connection data structure, stored in the memory of the security gateway element. Without a mechanism to enable other nodes in the cluster to handle the packets of the established connections the reliability and flexibility of the firewall system is severely compromised.

In prior art security gateway clusters the contents of the connection data structures and possible other state information are synchronized between the nodes periodically. This synchronization of connection data structures is carried out by opening a communication channel within the cluster and sending the connection data structure entries from each cluster node to the others on a timely basis. The updates may be full connection data structures every time or differential, that is only updated connection data structure entries are sent. The result is that all the nodes in the cluster have equal information about the opened connections.

A problem relating to the synchronization is the synchronization interval. New connections may be opened and packets belonging to them may be sent to the cluster of nodes that were not responsible for opening them before the state table entries are transferred as part of the synchronization. This is the case especially if the synchronization interval is large. The synchronization interval should thus be quite short, in order to ensure reliable and flexible connections via the security gateway cluster. On the other hand, a too short synchronization interval may cause a wasteful use of the resources in the nodes of a security gateway cluster.

Another problem is that as the entire connection data structure is synchronized across the whole cluster. This requires enough memory in each node to handle all the entries concerning the connections through the cluster.

Until nowadays, typical gateways have been designed to operate merely as single nodes, and clustering requirements have not been emphasized. At the time of writing this application high availability and clustering are however becoming more and more important issue.

SUMMARY OF THE INVENTION

Object of the invention is to present a flexible and reliable synchronization of state information between nodes in a security gateway cluster. A further object is to present such synchronization of state information, where memory and processing resources in a security gateway cluster are used economically.

Objects of the invention are achieved by determining actions, which typically demand synchronization of state information, and by triggering synchronization of state information, when a predetermined action is detected.

A method according to the invention is a method for synchronizing state information in a security gateway cluster, said security gateway cluster comprising at least two nodes, said method comprising the step of:

synchronizing state information by sending state information from a first node of said at least two nodes, and said method being characterized in that it comprises the steps of:
  detecting in said security gateway cluster a predetermined irregularly occurring action, and
  initiating synchronization of state information as a response to said action, and in that in said step of synchronizing state information, state information is sent to at least a second node of said at least two nodes The invention relates to a computer program comprising program code for performing all the steps of a method according to the invention when said program is run on a computer. The invention further relates to a computer program product comprising program code means stored on a computer readable medium for performing a method according to the invention when said program product is run on a computer.

A first software entity according to the invention is a software entity for a node in a security gateway cluster, said first software entity comprising
  program code means for processing data packets,
  program code means for storing state information of said node, and
  program code means for synchronizing said state information with at least a second first software entity in one other node of said security gateway cluster, and the first software entity is characterized in that it further comprises
  program code means for receiving from said second software entity instructions to initiate synchronizing said state information, and in that said program code means for synchronizing said state information are arranged to initiate synchronization as a response to receipt of instructions to initiate synchronization.

A second software entity according to the invention is a software entity for a node in a security gateway cluster, said second software entity comprising
  program code means for monitoring data packets relating to certain communication protocol connections, and said second software entity being characterized in that it further comprises
  program code means for delivering to a first software entity instructions to initiate synchronizing said state information.

The invention further relates to a node of a security gateway cluster, said node comprising
  means for storing state information of said node, and
  means for synchronizing said state information with at least one other node of said security gateway cluster, and being characterized in that it further comprises
  means for detecting a predetermined irregularly occurring action, and
  means for initiating synchronization of said state information as a response to said irregularly occurring action.

A security gateway cluster according to the invention is a cluster having a plurality of nodes, at least one node comprising
  means for storing state information of said node, and
  means for synchronizing said state information with at least one other node of said security gateway cluster, and said security gateway cluster being characterized in that said at least one node further comprises
  means for detecting a predetermined irregularly occurring action, and
  means for initiating synchronization of said state information as a response to said action.

The appended dependent claims describe some preferred embodiments of the invention. The features described in one dependent claim may be further combined with features described in another dependent claim to produce further embodiments of the invention.

The term state information refers to any information regarding the state of a node in a security gateway cluster. Typically, the state information is simply the connection data structure, but it may also include for example information relating to intrusion detection mechanisms, VPN parameters, authentication information or state of a protocol-specific program code.

Part of state information may be common state information, i.e. state information to which all nodes of a gateway cluster should have access. Examples of such common state information are information relating to VPN connections (keys, authentication information etc.) and authentication information. Part of state information may be node specific: each node has its own node-specific state information, i.e. information about the connections handled by that specific node, which other nodes need not know, unless there is, for example, some problem in the operation of the node and connections are transferred to other node(s) of the cluster. In order to enable the transfer, the new node receiving the connections needs to receive also relevant state information.

In a method according to the invention, there is a number of predetermined actions, which typically occur irregularly and which give rise to need for state information synchronization. Typically these predetermined actions are defined based on the requirements, which the functionality of security gateway element should meet. The following actions are examples of such predetermined, irregularly occurring actions: modification of state information in a node; a node failing to continue normal operation; a node requesting state information (this node being, for example, either a new node in a security gateway cluster or a node, which is reset); a node initiating transition to offline state; data packets relating to a communication session being handled in at least two nodes; and receipt of a data packet opening a new connection via said security gateway cluster. All these actions need not cause initiation of state information synchronization in a certain security gateway cluster. Furthermore, many other actions may cause initiation of state information synchronization in a security gateway node or cluster according to the invention.

When state information synchronization is initiated as a response to a predetermined action, it is not necessary to use periodical synchronization of state information in a security gateway cluster. It is possible to ensure that state information is synchronized often enough even without periodic state information synchronization. This is one advantage of the invention. Alternatively periodic state information synchronization may be combined with on-demand state information synchronization according to the invention. In this case it is possible to choose a longer synchronization interval than when using plain periodic state information synchronization, without compromising reliability of a security gateway cluster. Furthermore, it is possible to switch between pure periodic synchronization, on-demand synchronization according to the invention and the combination of the two, depending, for example, on available memory or synchronization bandwidth.

The synchronization of state information may be performed across all nodes of a security gateway cluster. The purpose of this is that each node would have the same state information. Common state information is typically synchronized across all nodes of a security gateway cluster. In addition to common state information and node-specific state information it is possible that in some or in all nodes there is furthermore backup state information. This backup state information refers to state information, which is typically node-specific state information of another node (or other nodes) in a security gateway cluster. In order to save memory and processing capacity, node-specific state information is advantageously not synchronized across all nodes of a security gateway cluster. Instead, at least one backup node is typically defined for each node in a security gateway cluster. This way such modification of node-specific state information, which is not related to opening connections via other nodes, typically initiates only synchronization of this node-specific state information to backup node(s). Synchronization of node-specific state information to backup nodes may be either periodical synchronization and/or on-demand synchronization according to the invention. Furthermore, other alternatives for synchronization may be also applicable.

When node-specific state information is synchronized by sending it only to backup nodes instead of sending it to all nodes, this saves memory and processing resources in a security gateway cluster. A node needs to store (in addition to common state information) its own node-specific state information and node-specific state information of the nodes, for which it acts as a backup node. If no backup arrangement is used, node-specific state information is typically synchronized across all nodes of a security gateway cluster. In addition, as node-specific state information is transmitted only to backup node(s) instead of all other nodes, synchronization traffic in a security gateway cluster is reduces and processing/transmission resources are used economically.

BRIEF DESCRIPTION OF THE DRAWING

The invention is now described in more detail with reference to the accompanying drawing, where.

DETAILED DESCRIPTION OF THE INVENTION

FIGS. 1–3 are discussed in more detail above in connection with the prior art description.

Figure 4:
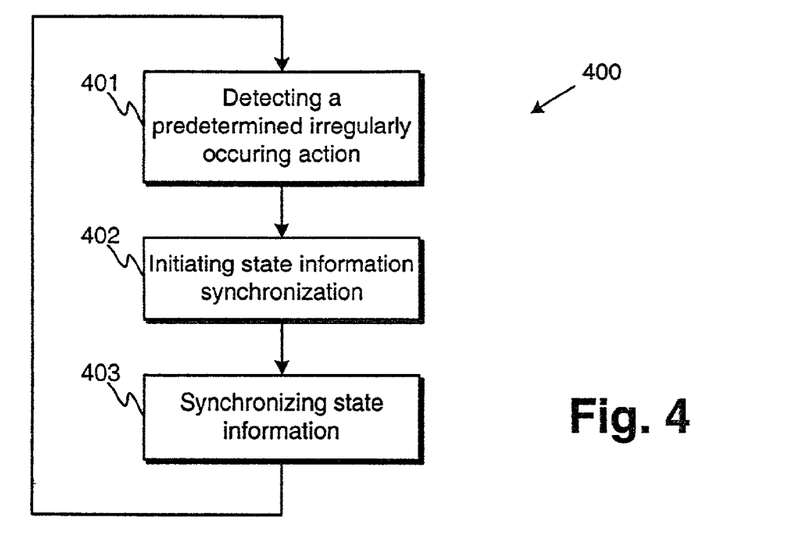
FIG. 4 illustrates as an example a flowchart of a method for synchronizing state information in accordance with the invention.

FIG. 4 illustrates as an example a flowchart of a method 400 for synchronizing state information in accordance with the invention. In step 401 a predetermined irregularly occurring action is detected. In step 402 state information synchronization is initiated as a response to the detected action. In step 403 state information is synchronized by sending state information from at least one node to at least another node of a security gateway cluster.

In synchronizing state information it is possible to send only a modified part of state information (of either common state information or node-specific state information) from said one node to other node(s). Alternatively, it is possible to send state information as it is after the modification.

Figure 5:
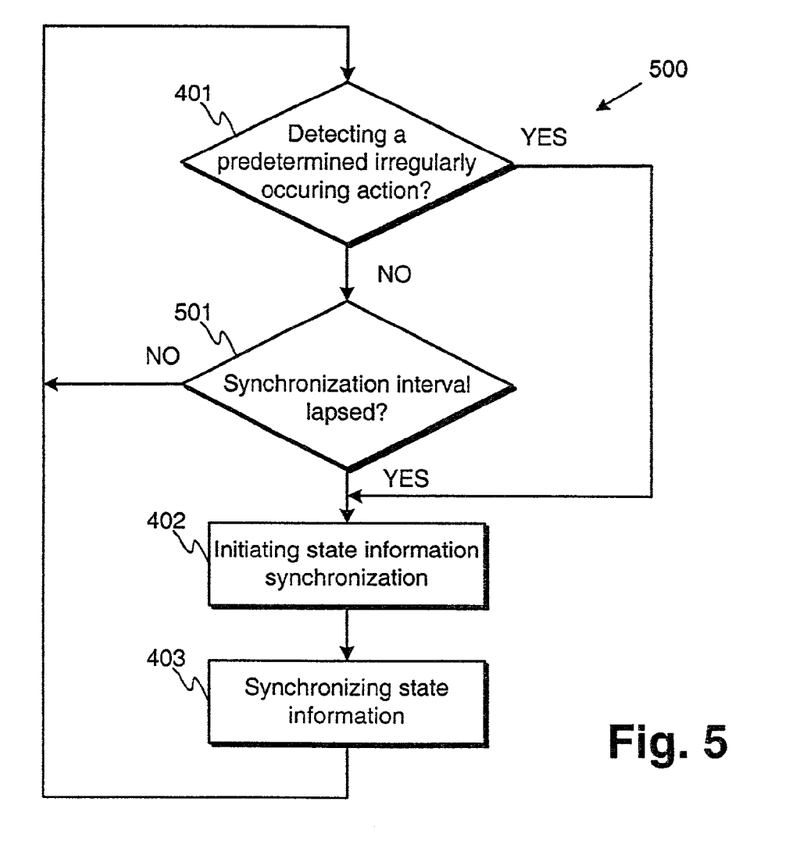
FIG. 5 illustrates as an example a flowchart of a method for synchronizing state information, said method combining periodical synchronization with on-demand synchronization according to the invention.

FIG. 5 illustrates as an example a flowchart of a method 500 for synchronizing state information, said method combining periodical synchronization with on-demand synchronization according to the invention. In step 401, it is checked if a predetermined irregularly occurring action is detected. If it is, step 402 and 403 are performed. In step 501 it is checked, if a synchronization interval of periodic state information synchronization has lapsed since the latest detected action, which initiated on-demand synchronization according to the invention. This checking is typically done periodically, and may be implemented, for example, using timers. If a synchronization interval has already lapsed, synchronization is carried out (steps 402, 403) and a corresponding timer, if there is such, is reset. If a synchronization interval has not yet elapsed, it is again checked if a predetermined action is detected. The possible timer is reset typically also, when on-demand synchronization according to the invention is carried out.

If the clustering decisions (i.e. decision about which node handles a certain connection) can be made in a reliable way so that the same node always handles all packets belonging to the same connection in case there are no malfunctions, it is possible to turn off the periodic synchronization of state information. Related connections (such as an FTP data connection relating to an FTP control connection) may still be synchronized, but otherwise each security gateway node has its own state table entries and other node-specific state information. This will prevent transparent failover (transfer of existing connections to another node) in case of unexpected and complete crash of one of the nodes, but if limited scope failures are detected by software, a full synchronization can be initiated.

Another approach that addresses also the transparency requirements in a sudden crash situation is to limit the number of nodes receiving the synchronized state table entries. The clustering technology is modified so that in case of one-node crash, the traffic handled by that node is transmitted to one of the remaining nodes or a limited subset of nodes instead of distributing it among all the remaining nodes. This makes it possible to select one or more backup nodes for each of the cluster nodes. The selection can be either node-specific or connection-specific. Connection-specific selection causes more work as every connection must be tagged in the connection data structure and, in case one of the nodes leaves the cluster, there is need to resynchronize the corresponding entries with some of the remaining nodes.

In any of the limited synchronization schemes some information must still be synchronized over the whole cluster. This includes those related connections whose properties cannot be accurately predicted, authentication, VPN parameters and other information that may relate to multiple connections.

Figure 6:
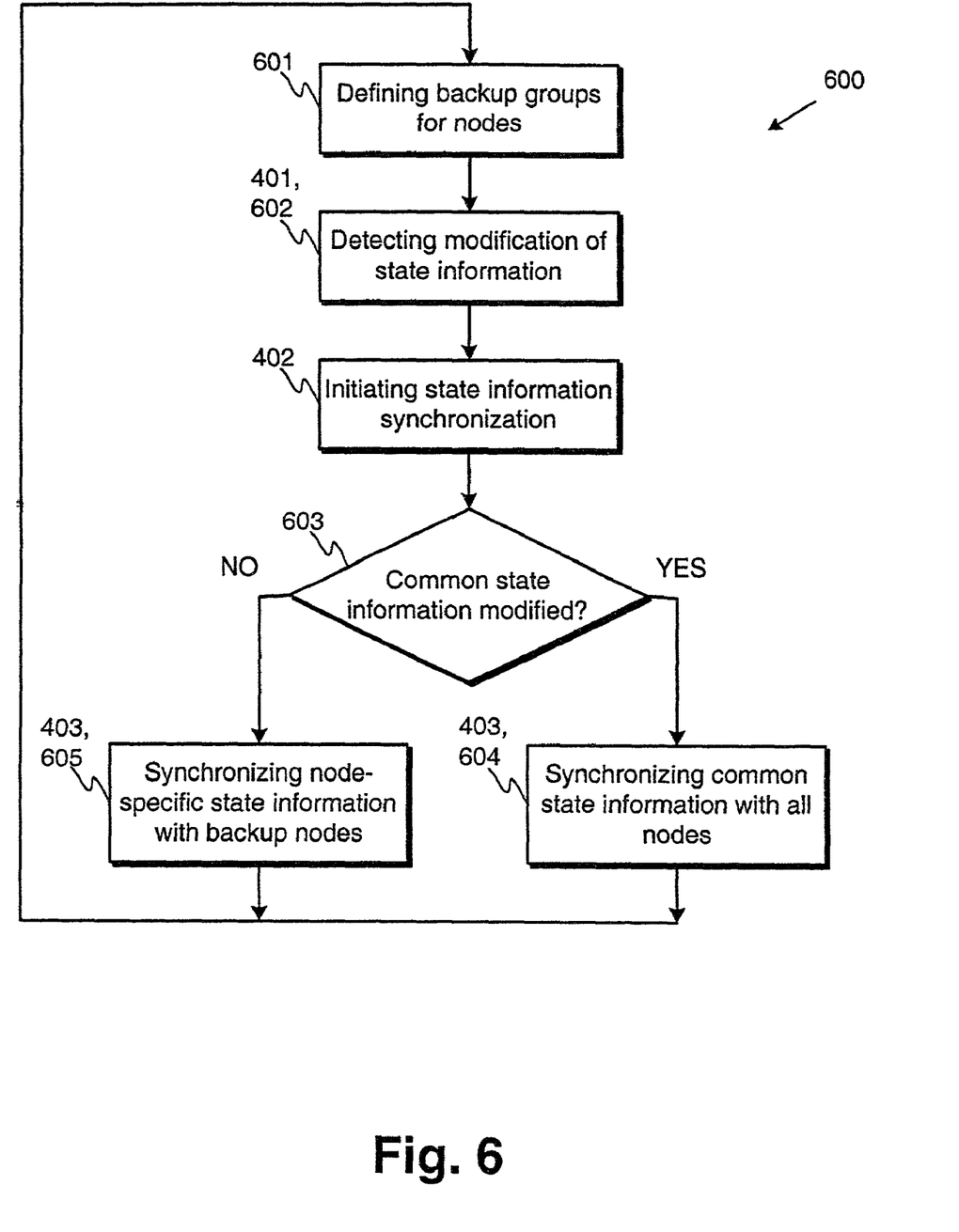
FIG. 6 illustrates as an example a flowchart of a method, where state information is synchronized between backup nodes.

FIG. 6 illustrates as an example a flowchart of a method 600, where state information is synchronized between backup nodes. In step 601, backup groups (or, in other words, backup nodes) are defined for at least some nodes in a security gateway cluster. In step 602, which is a specific example of step 401, modification of state information is detected. In step 402 state information synchronization is initiated as a response to said modification of state information. In step 603 it is checked, if the modified state information is common state information. If it is, common state information (either all or only the modified part) is synchronized across all nodes of the security gateway cluster. If node-specific state information is modified, this node-specific state information (either all or only the modified part) is synchronized in step 605 by sending it to backup node(s) of the node, where modification of node-specific state information is detected. It is possible that modification of state information involves modification of both common state information and node-specific state information. In this case step 604 and 605 are both performed. Typically, the steps 602 and 603 may be performed at the same time.

Figure 7:
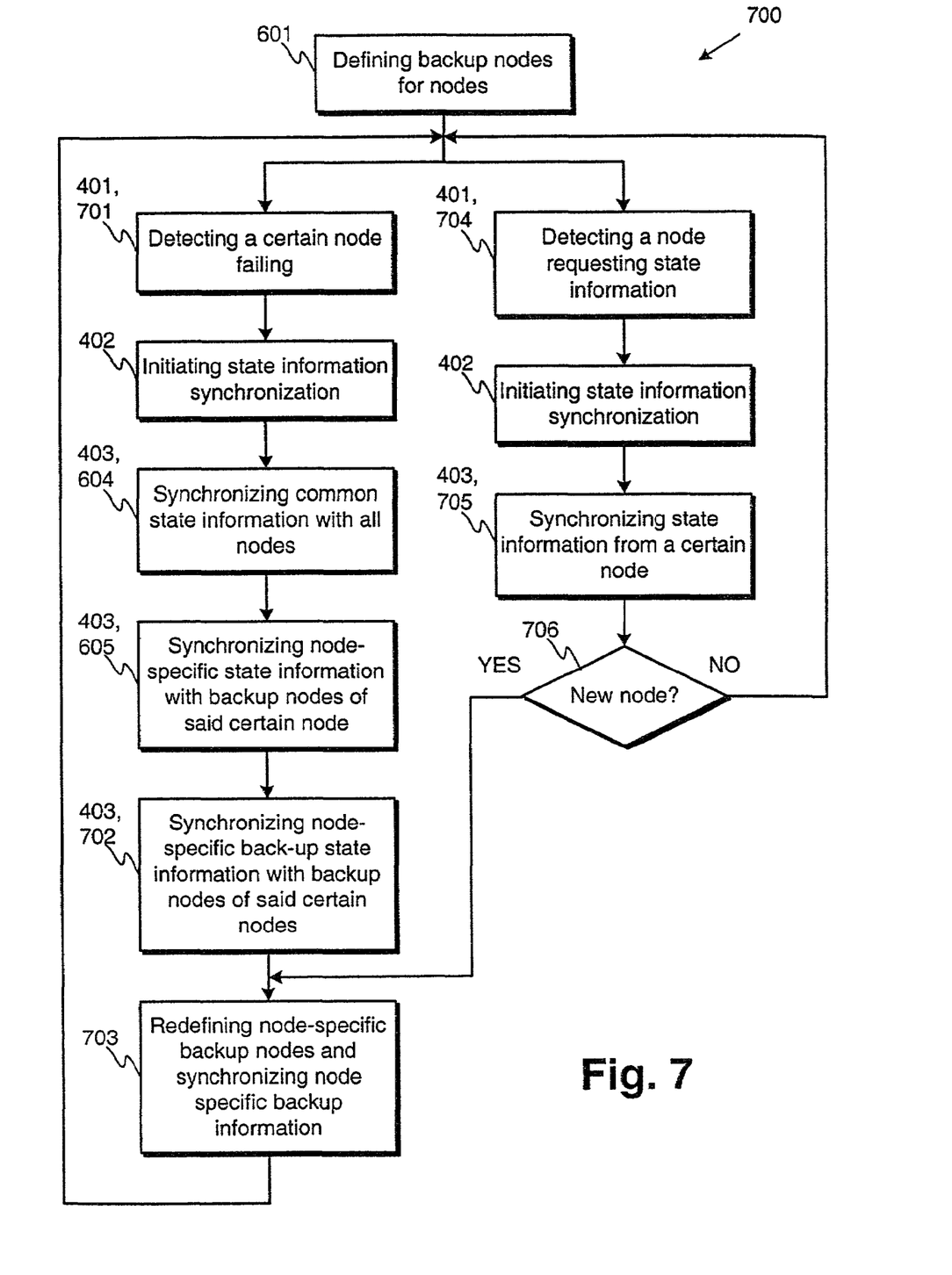
FIG. 7 illustrates as an example a flowchart of a method, where state information is synchronized between backup nodes and where the number of operating nodes in a cluster changes.

FIG. 7 illustrates as an example a flowchart of a method 700, where state information is synchronized between backup nodes and where the number of operating nodes in a cluster changes. In step 601 backup nodes for nodes are defined, similarly as in method 600. If it is detected that a certain first node fails to continue its normal operation (or initiates transition to off-line mode) in step 701, state information synchronization is initiated (step 402). Typically common state information of the first node is synchronized across all nodes of the security gateway cluster (step 604). Node-specific state information is synchronized with backup node(s) of the first node (step 605). Backup state information, which is stored in the first node and which relates to those nodes for which this first node acts as a backup node, may be transmitted for example to backup nodes of this first node (step 702). This optional step ensures that no node remains without a backup node. Thereafter the backup nodes for nodes are redefined in step 703 and, as a consequence, backup information is transmitted between nodes accordingly.

In step 704 it is detected that a second node requests for state information. The second node requesting state information may be, for example, a new node added to the security gateway cluster or it may a node, which is reset. Synchronization of common state information and possible backup information, which is node-specific state information of a reset node, typically takes places by sending the common and back-up state information from one node to the second node. If the second node is a new node (step 706), backup nodes for nodes are typically redefined in step 703. This is done also, if the second node is a reset node, whose failing to continue normal operation has been detected earlier (step 701).

When backup nodes are defined for nodes in a security gateway cluster, a node may have one or more backup nodes. Consider, for example, the security gateway cluster 18 in FIG. 1. One possibility to define backup nodes is to make a cyclic backup arrangement. In one cyclic backup arrangement, node 19a acts as backup node for node 19b, node 19b acts as a backup node for node 19c, and node 19c acts as backup node for node 19a. This cyclic backup arrangement requires in each node roughly ⅔ (⅓ for node's own node-specific state information and ⅓ for backup state information stored in the node) of the memory that is required, when node-specific state information is synchronized across all nodes of the security gateway cluster 18.

The advantages of using backup nodes are not restricted to cases, where on-demand synchronization according to the invention is used. Despite the synchronization method, the use of backup nodes makes use of memory and transmission resources in a security gateway cluster more efficient. Therefore the features described in the appended dependent claims 8, 9, 10 and 32 are advantageous and may be used in connection with various synchronization methods, not only with initiated on-demand synchronization as specifically described therein.

Figure 8:
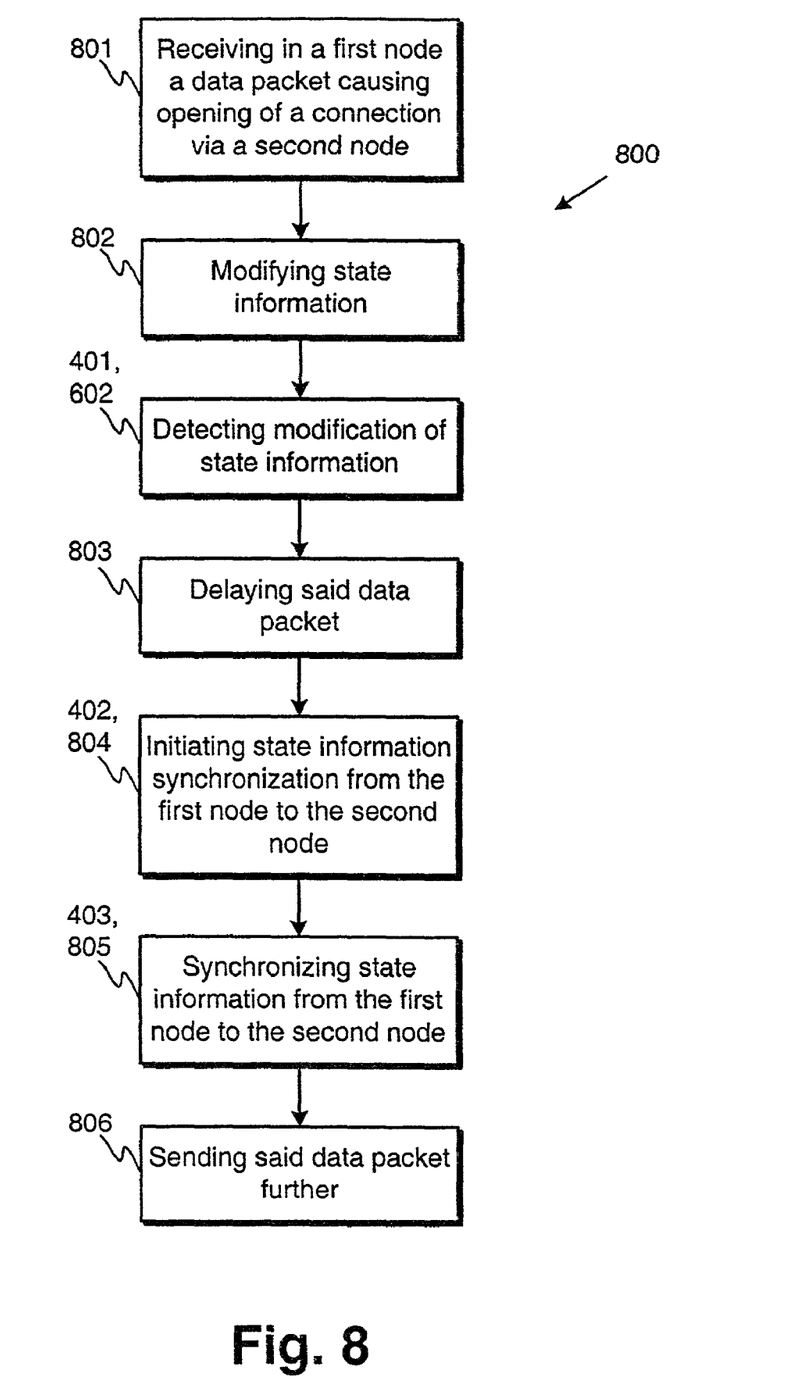
FIG. 8 illustrates as an example a flowchart of a method, where a data packet opening a new connection via a security gateway cluster triggers state information synchronization and said data packet is delayed.

FIG. 8 illustrates as an example a flowchart of a method 800. In step 801 a data packet causing an opening of a new connection via a second node in a security gateway cluster is received in a first node of said security gateway cluster. In step 802 state information relating to the new connection is generated in said first node as a result of receipt of the data packet. The state information is not necessarily stored in the connection data structure of the first node. This step is not necessarily a separate step, it may be implicit. Generation of state information may automatically cause delaying of a data packet and/or initiation of state information synchronization. In step 803 the data packet is delayed until state information synchronization is performed. In step 804 synchronization of the generated state information is initiated, and in step 805 synchronization is performed by sending state information from the first node to the second node. When synchronization of state information is completed, the data packet is sent onwards in step 806.

The following example illustrates further the method 800. Consider a three-node security gateway cluster comprising nodes 1, 2 and 3; this security gateway cluster being similar to the security gateway cluster 18 illustrated in FIG. 1. Consider further an FTP connection through the security gateway cluster from client A to server B. The client opens the standard FTP control connection (TCP, port 21) to the server. The clustering mechanism selects, as an example, node 1 to handle the connection. A connection data structure entry for this connection is created on node 1, and nodes 2 and 3 do not know about the connection at all at this point.

The protocol-specific program code for FTP protocol is attached to the connection, which means that all the packets are passed from the firewall engine in node 1 to the protocol-specific program code. One of the functions of the protocol-specific program code is that it scans the data content of the packets and searches specific command strings. One of these is "PORT", the FTP protocol command to open data connections from the server back to the client. If this command is detected with a valid IP address and port as parameters, the protocol-specific program code will inform the firewall engine to accept the data connection and add it to the connection data structure in node 1. If it is known that the data connection will be processed by some other node than the node 1, the data connection is not necessarily added to the connection data structure of the node 1.

Now that the security gateway is a cluster instead of a single device, there is the possibility that the data connection may end up being handled by a different node than node 1 that is selected in this example for the control connection. As presented above, the protocol-specific program code may now start a sequence of actions to ensure seamless operation regardless of the clustering decisions. First, as soon as the PORT command is detected, the packet flow of the FTP control connection through the firewall engine in node 1 is temporarily stopped. The protocol-specific program code then signals the software entity taking care of synchronization to send the new state table entry to at least one other cluster member. Only after this (or after a predetermined timeout) the control connection is allowed to continue.

Figure 9:
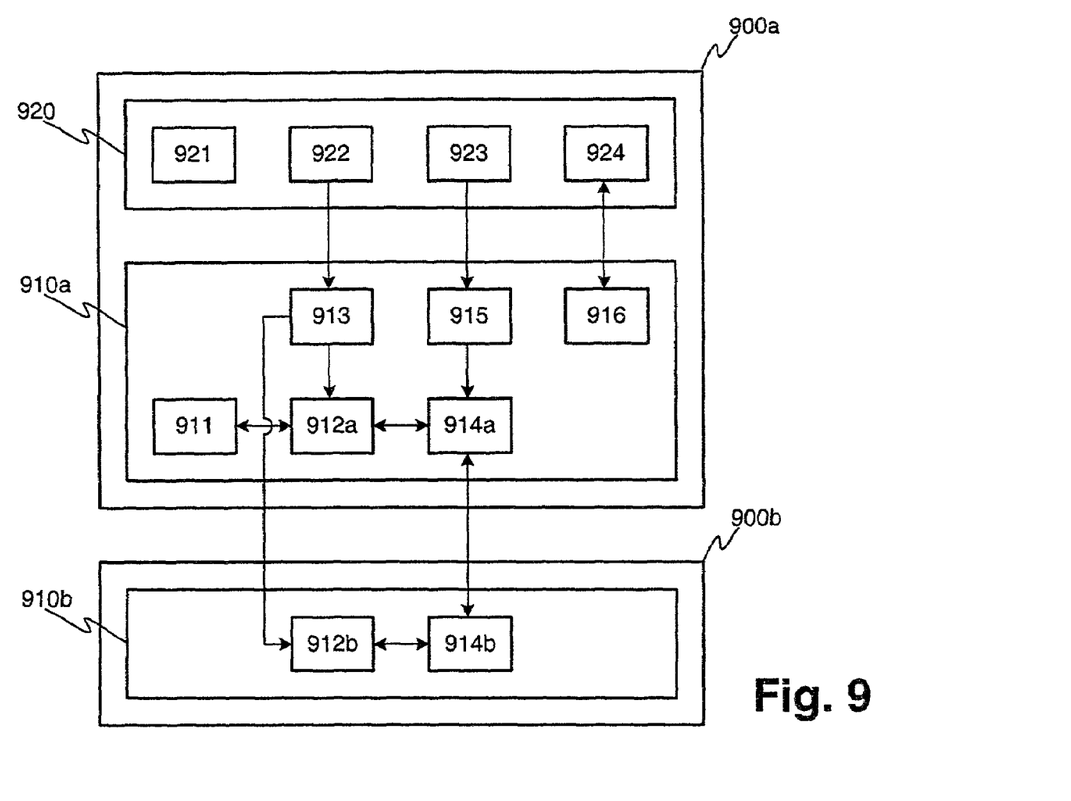
FIG. 9 illustrates as examples two software entities according to the invention.

FIG. 9 illustrates as examples two software entities 910, 920 according to the invention. A first software entity 910 for a node in a security gateway cluster is gateway engine software. It comprises program code means 911 for processing data packets, program code means 912 for storing state information of said node, program code means 913 for receiving instructions to modify said state information from a second software entity (protocol-specific program code) residing in a same node as said first software entity, and program code means 914 for synchronizing said state information with at least a second first software entity in one other node of said security gateway cluster. The first software entity is characterized in that it further comprises program code means 915 for receiving from said second software entity instructions to initiate synchronizing said state information, and in that said program code means 914 for synchronizing said state information are arranged to initiate synchronization as a response to receipt of instructions to initiate synchronization.

The second software entity 920 for a node in a security gateway cluster is a protocol-specific program code. It comprises program code means 921 for monitoring data packets relating to certain communication protocol connections, and program code means 922 for delivering to a first software entity (gateway engine) instructions to modify state information comprising information about connections. The second software entity is characterized in that it further comprises program code means 923 for delivering to the first software entity instructions to initiate synchronizing said state information. The second software entity may further comprise program code means 924 for delivering to the first software entity instructions to delay a specific data packet until an initiated synchronization is performed.

This second software entity may be, for example, a protocol-specific program code relating to FTP. The example about FTP control and data connections presented above describes functionality of such protocol-specific program code.

A data packet (or data packets) to be delayed may be delayed in either the first software entity 910 or in the second software entity 920. In the first software entity there may be means 916 for causing a data packet to be delayed until an initiated state information synchronization is complete. Similarly, in the second software entity there are corresponding means 924 for causing a data packet to be delayed until an initiated state information synchronization is complete.

If a data packet is delayed in the second software entity 920, the means 916 in the first software entity 910 are arranged to inform the second software entity, when an initiated state information synchronization is completed. The means 924 in the second software entity are in this case arranged to be informed and subsequently to trigger delivery of said data packet to the first software entity, more specifically typically to means 911.

If a data packet is delayed in the first software entity 910, the means 924 in the second software entity are typically arranged to inform the first software entity (more specifically means 916) to delay a data packet until an initiated synchronization of state information is completed. The means 916 are arranged to actually delay the data packet, for example by controlling means 911, where data packets are processed.

Typically, in addition to delaying a data packet, all subsequent data packets relating to the same packet data connections and possible arriving at the security gateway element are also delayed.

Figure 10:
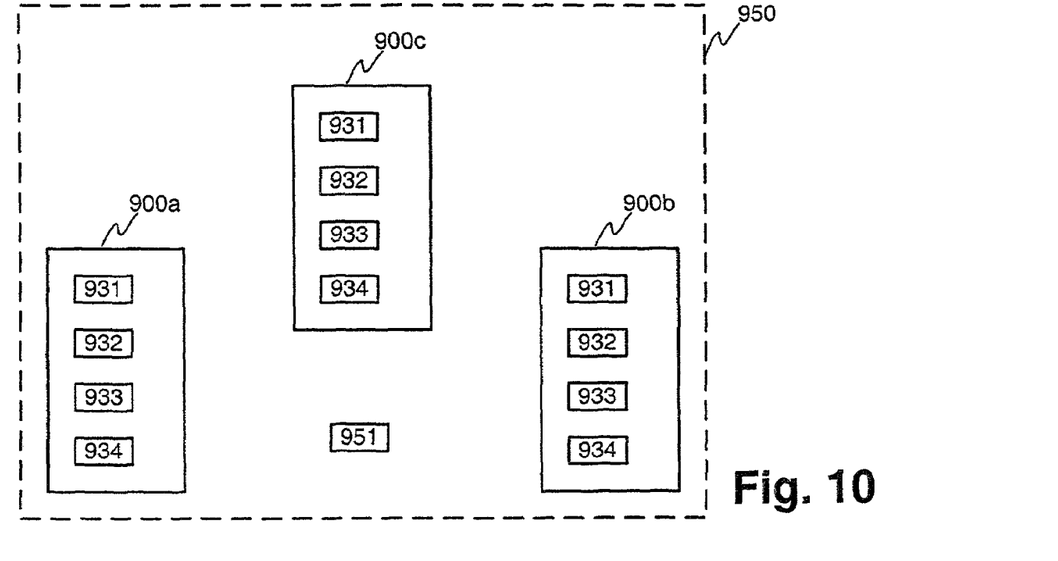
FIG. 10 illustrates as examples a security gateway node and cluster according to the invention.

FIG. 10 illustrates as examples a security gateway node 900 and cluster 950 according to the invention.

A node 900 of a security gateway cluster comprises means 931 for storing state information of said node and means 932 for synchronizing said state information with at least one other node of said security gateway cluster. It is characterized in that it further comprises means 933 for detecting a predetermined irregularly occurring action and means 934 for initiating synchronization of said state information as a response to said irregularly occurring action. These means may be implemented, for example, using a security gateway engine according to the invention (first software entity) and protocol-specific program code (second software entity).

A security gateway cluster 950 has at least two nodes 900a, 900b. At least one of the nodes comprises means 931, means 932, means 933 and means 934. Typically, all nodes include all these means. A security gateway cluster 950 may further comprise means 951 for defining for said at least one node a node-specific backup group by selecting at least one node-specific backup node, and in that said means 932 for synchronizing said state information with at least one other node of the security gateway cluster are arranged to synchronize said state information from said at least one node to respective node-specific backup group.

The means 931–934 and 951 are typically implemented as a suitable combination of hardware and software. They are advantageously implemented using software program code means executed by a processor unit. A security gateway element according to the invention or any of the software entities according to the invention may employ any method according to the invention. Some examples of such methods are described above.

In the view of the foregoing description it will be evident to a person skilled in the art that various modification may be made within the scope of the invention. It should be apparent that many modifications and variations to the above described examples are possible, all of which fall within the true spirit and scope of the invention.

The invention claimed is:

1. A method for synchronizing state information in a security gateway cluster, said security gateway cluster comprising at least two nodes, said method:

storing state information in a first node and in at least a second node of said at least two nodes in said security gateway cluster, state information stored in said first node comprises common state information and node-specific state information, defining for each node belonging to said security gateway cluster a node-specific backup group comprising at least one node-specific backup node, synchronizing said state information in said security gateway cluster by sending state information from said first node to at least said second node of said at least two nodes, detecting in said security gateway cluster a predetermined irregularly occurring action, initiating said step of synchronization of state information as a response to said predetermined irregularly occurring action, said predetermined irregularly occurring action including a modification of state information so that modification of common state information initiates synchronization of common state information to all other nodes of said security gateway cluster, and modification of node-specific state information initiates synchronization of node-specific state information to nodes belonging to backup group of said first node.

2. A method according to claim 1, wherein said predetermined action is modification of said state information stored in said first node.

3. A method according to claim 2, wherein in the step of synchronizing state information only modified part of the state information stored in said first node is sent.

4. A method according to claim 3, wherein the modified part of the state information is sent from said first node to all other nodes of said security gateway cluster.

5. A method according to claim 4, wherein the modified part of the state information relates to a certain protocol, authentication information, virtual private network parameters or intrusion detection system.

6. A method according to claim 1, wherein in the step of synchronizing state information all state information stored in said first node is sent.

7. A method according to claim 1, further comprising the step of:
periodically synchronizing state information from said first node to at least a second node.

8. A method according to claim 1, wherein said predetermined action affects number of nodes in said security gateway cluster, said method further comprising the step of:
redefining for at least one node belonging to said security gateway cluster a backup group comprising at least one backup node.

9. A method according to claim 1, wherein said predetermined action is said first node failing to continue normal operation.

10. A method according to claim 1, wherein said predetermined action is said second node requesting for state information.

11. A method according to claim 1, wherein said predetermined action is said first node initiating a transition to offline state.

12. A method according to claim 1, wherein said predetermined action is handling of data packets relating to a communication session in at least two nodes, one of them being said first node, and in that said synchronization of state information is performed between at least said at least two nodes.

13. A method according to claim 1, wherein said predetermined action is a receipt of a data packet in said first node of said security gateway cluster, said data packet relating to a command to open a new connection via said security gateway cluster.

14. A method according to claim 13, further comprising the
delaying sending of said data packet from said first node until said synchronization of state information is performed.

15. A method according to claim 1, further comprising the step of:
delaying sending of a plurality of data packets from said first node until said synchronization of state information is performed.

16. A node of a security gateway cluster comprising
means for storing state information of said node, said state information comprising common state information and node-specific state information,
means for defining for said node a node-specific backup group of nodes comprising at least one node-specific backup node,
means for synchronizing said state information in said security gateway cluster by sending state information from said node to at least one other node in said security gateway cluster,
means for detecting a predetermined irregularly occurring action,
means for triggering said synchronization means as a response to said predetermined irregularly occurring action, said predetermined irregularly occurring action including a modification of state information so that modification of common state information initiates synchronization of common state information to all other nodes of said security gateway cluster, and modification of node-specific state information initiates synchronization of node-specific state information to nodes belonging to backup group of said node.

17. A security gateway cluster having a plurality of nodes, at least one node comprising
means for storing state information of said node, said state information comprising common state information and node-specific state information,
means for defining for said node a node-specific backup group of nodes comprising at least one node-specific backup node,
means for synchronizing said state information in said security gateway cluster by sending state information from said node to at least one other node in said security gateway cluster,
means for detecting a predetermined irregularly occurring action,
means for triggering said synchronization means as a response to said predetermined irregularly occurring action, said predetermined irregularly occurring action including a modification of state information so that modification of common state information initiates synchronization of common state information to all other nodes of said security gateway cluster, and modification of node-specific state information initiates synchronization of node-specific state information to nodes belonging to backup group of said node.

18. A computer readable medium containing a a computer-executable configured to perform at least the following routines for synchronizing state information in a security gateway cluster of at least two nodes when said program
storing state information in a said node and in at least a second node in said security gateway cluster, said stored state information stored comprising common state information and node-specific state information,
defining for said node a node-specific backup group of nodes comprising at least one node-specific backup node,
synchronizing said state information in said security gateway cluster by sending state information from said node to at least said second node,
detecting in said security gateway cluster a predetermined irregularly occurring action,
initiating said step of synchronization of state information as a response to said predetermined irregularly occurring action, said predetermined irregularly occurring action including a modification of state information so that modification of common state information initiates synchronization of common state information to all other nodes of said security gateway cluster, and modification of node-specific state information initiates synchronization of node-specific state information to nodes belonging to backup group of said node.

* * * * *